United States Patent [19]

Voorhees

[11] Patent Number: 4,482,431
[45] Date of Patent: Nov. 13, 1984

[54] DISTILLATION APPARATUS WITH A LIQUID-VAPOR SEPARATING DEVICE HAVING THREE CHAMBERS

[76] Inventor: John L. Voorhees, 2504 Kimberly St., Silver Spring, Md. 20902

[21] Appl. No.: 467,922

[22] Filed: Feb. 18, 1983

[51] Int. Cl.³ .............................................. B01D 3/04
[52] U.S. Cl. ................................... 202/176; 202/197; 202/180; 202/181; 203/10
[58] Field of Search ............... 202/180, 197, 181, 187, 202/237, 199, 185 D, 185.5, 165, 166, 167; 210/188

[56] References Cited

U.S. PATENT DOCUMENTS

| | | | |
|---|---|---|---|
| 1,113,521 | 10/1914 | Waterhouse | 202/237 |
| 1,361,910 | 12/1920 | Schubert | 202/185.5 |
| 2,423,205 | 7/1947 | Rowntree | 202/197 |
| 2,475,482 | 7/1949 | Clemens | 202/180 |
| 3,080,302 | 3/1963 | Rogers et al. | 202/234 |
| 3,326,202 | 6/1967 | Sullivan | 202/187 |
| 3,334,027 | 8/1967 | Goeldner | 202/197 |
| 3,694,321 | 9/1972 | Marovich et al. | 202/197 |
| 3,830,705 | 8/1974 | Dewegeli | 203/10 |
| 4,110,170 | 8/1978 | Kirschman et al. | 202/180 |
| 4,148,693 | 4/1979 | Williamson | 202/197 |
| 4,331,514 | 5/1982 | Bauer | 202/185.5 |
| 4,339,307 | 7/1982 | Ellis, Jr. | 202/190 |
| 4,350,568 | 9/1982 | Dalupan | 202/180 |

Primary Examiner—Wilbur Bascomb
Assistant Examiner—V. Manoharan
Attorney, Agent, or Firm—Cushman, Darby & Cushman

[57] ABSTRACT

A distillation apparatus is provided having a first chamber for receiving water to be distilled and which surrounds one end of a second chamber and also contains the condensing tube; liquid from the first chamber passes to a tube located in a second chamber which traverses a path sufficient to heat the water in the tube to a predetermined temperature before exiting through a valve to a liquid/gas separating device; a third chamber receives the liquid from the separation device and is provided with a heater to heat the liquid until it vaporizes whereupon it rises through the second chamber to enter the condenser tube located in the first chamber; the steam entering the condensing tube is cooled by the incoming water and is discharged from the apparatus.

11 Claims, 4 Drawing Figures

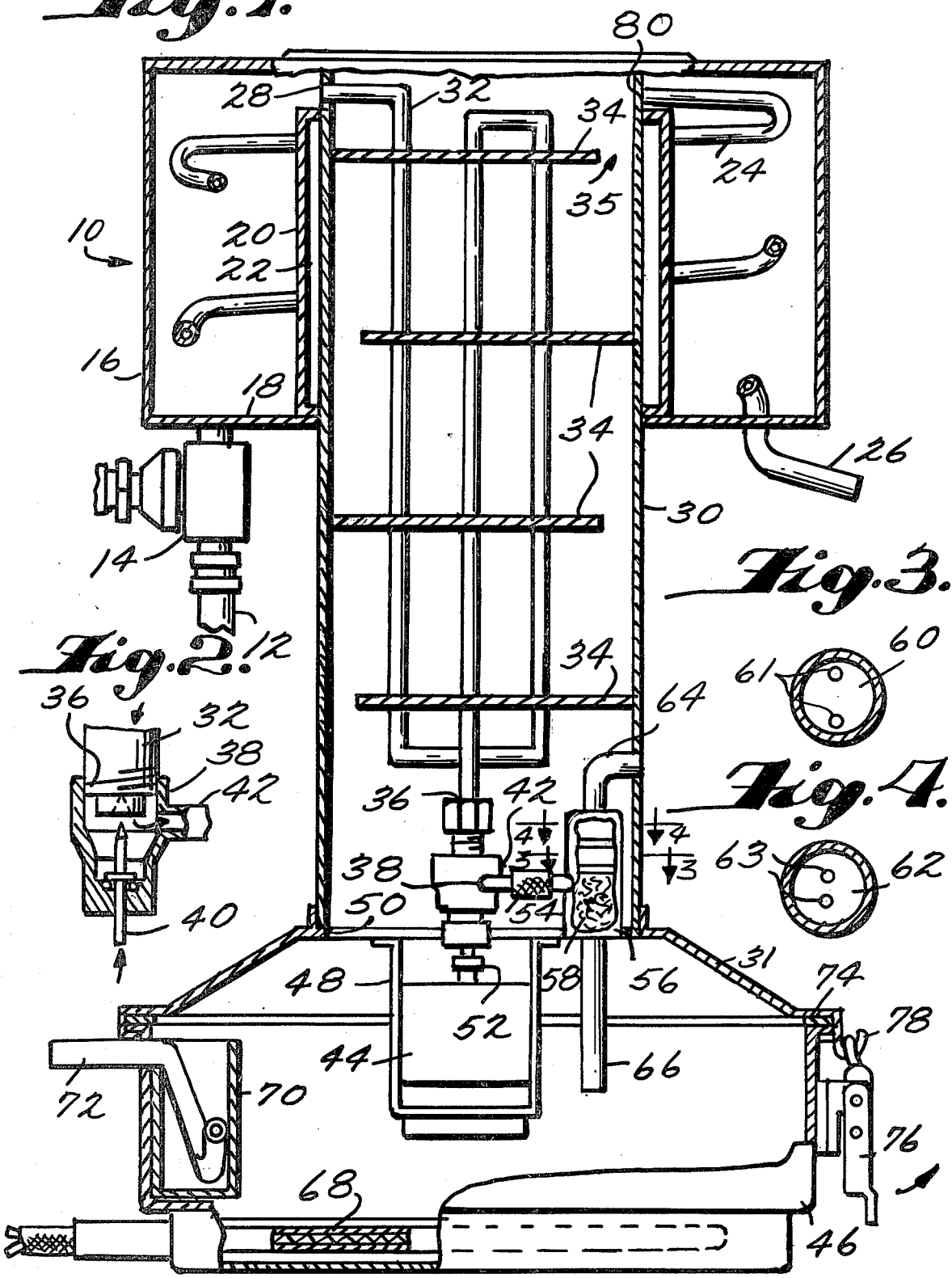

DISTILLATION APPARATUS WITH A LIQUID-VAPOR SEPARATING DEVICE HAVING THREE CHAMBERS

BACKGROUND AND SUMMARY OF THE INVENTION

The present invention relates to an improved distillation apparatus which is particularly suited for domestic use and which requires very little care or monitoring once placed in operation.

Distillation devices of the prior art tended to be bulky and have required costly installation, particularly where large quantities of distilled water were required. In addition, expensive monitoring devices have often been necessary where such units were intended to operate unattended so as to minimize the possibility of overflow or damage which is a frequent difficulty in the event water fails to be supplied continuously to the unit. As a result of these factors, one of the chief drawbacks of the presently available devices has been their cost so that generally only persons living in areas having marginal water quality would resort to the purchase of such devices. However, with the increasing congestion in municipal areas and the instability of water supplies in other localities, the demand for purified water has markedly increased.

Accordingly, it is an object of the present invention to provide a distillation apparatus that is compact yet highly efficient in terms of output and, due to its simplicity, can be manufactured at a significant cost saving over many devices of the prior art. In addition, the device of the present invention can be manufactured on a scale so that it can be portable and will require no special installation in terms of plumbing or electrical power. Further, the apparatus of this invention has its parts arranged such that periodic cleaning of the device can be readily effected without any major disassembly of the parts and which are arranged such that the intervals between cleanings will be significantly longer than has previously been the case.

The foregoing and other advantages of the present invention will become apparent as consideration is given to the following detailed description taken in conjunction with the accompanying drawings, in which:

BRIEF DESCRIPTION OF THE DRAWINGS

FIG. 1 is an elevational view in section of the device of the present invention;

FIG. 2 is a sectional view of the valve means of the present invention;

FIG. 3 is a view taken along lines 3—3 of FIG. 1; and

FIG. 4 is a view taken along lines 4—4 of FIG. 1.

DETAILED DESCRIPTION OF THE INVENTION

Turning now to the drawings wherein like numerals designate corresponding parts throughout the several views, there is shown in FIG. 1, the distillation apparatus 10 of the present invention. The operation of the apparatus 10 will become apparent as this description proceeds.

A hose 12 which is connected to a source of water to be purified such as a domestic tap is in turn connected to a pressure regulator 14, such as one manufactured by Watts Regulator Co. This type of regulator will convert an incoming pressure within the approximate range of 20 to 100 psi to an output pressure in the range of 6-10 psi. Such a regulator will thus enable a user to connect the device 10 to a domestic tap in most localities without requiring any adjustments by the user. The pressure should, of course, be regulated so that the throughput volume will not exceed the capacity of the valve 38 or the heater 68, described below. From the pressure regulator 14, water is delivered through the base wall 18 of a first chamber 16. The first chamber 16 is in the shape of an annulus surrounding the upper end of a second chamber 30. An interior wall 20 provides a space 22 which will function as an insulator or suitable insulation may be inserted in space 22 when the device is assembled so as to surround the upper end of the second chamber 30. Upon filling of the first chamber 16, the water will pass through opening 28 and fill tube 32 since the water in first chamber 16 is under pressure regulated by the device 14. The tube 32, as illustrated, is bent several times to provide a lengthened path in the second chamber 30. The tube 32 passes through and is supported by the spaced apart baffle walls 34 which are suitably secured as by a friction fit to the interior wall of second chamber 30. As can be seen in FIG. 1, each baffle wall 34 extends over a major portion of the cross-section of the cylindrical chamber 30 leaving only a small space 35 for the passage of steam. As a result of this configuration, the effective interval during which the content of the tube 32 is exposed to heat is greatly lengthened as compared to an arrangement where no baffles 34 are provided.

At the end 36 of tube 32 there is provided a valve housing 38 containing a valve member 40 which is preferably a needle valve controlled by a float member 44. The float element 44 is supported in a cage 48 disposed in a third chamber 46 which is in the form of a cylindrical pan whereby the liquid level in the third chamber 46 controls the position of the float 44 and thus the position of the valve member 40. When the liquid level is at a predetermined low level, the valve member 40 will be opened to permit passage of heated liquid from tube 32 through outlet 42 whereby liquid will pass through a connector 54 to a gas/liquid separator 56. The cage 48, as well as the gas/liquid separator 56, may be supported by connection to the flange 50 at the lower end of the second chamber 30 or by any other suitable means, as will be apparent to those skilled in this art.

The gas/liquid separator includes a cell 56 having a lower first portion which contains a bundle of wire mesh preferably of stainless steel fibers. The heated liquid from tube 32 is injected into the first portion of the cell 56 containing the wire mesh 58. The wire mesh will be at an elevated temperature due to its proximity to a heating element 68 located in the third chamber 46. As a result, the liquid impinging on the wire mesh, which is already at an elevated temperature, may be further heated to facilitate separation of volatile gases from the liquid. Immediately above the wire mesh 58 there is disposed in the separator a first baffle 60 having separated apertures 61 through which gases pass. A second baffle 62 further divides the cell into a third portion and is also provided with apertures 63 which are out of alignment with the apertures 61 in baffle wall 60. With this arrangement, loss of liquid by splashing or turbulence will be prevented so that only gases will pass through the tube 64 which has its outlet through the wall of the second chamber 30. The bottom wall of the cell 56 is supplied with a tube 66 through which the liquid passes into third chamber 46.

The third chamber 46 has a diameter that is approximately twice the diameter of chamber 30. This ratio of diameters should be maintained as it provides a large relative surface area in chamber 46 which, in conjunction with the baffles 34, prevents the formation of a vortex in chamber 30. The wide base of chamber 46 also provides a stable base for the device particularly when filled with water. In chamber 46 there is provided an electrical heating element 68 which may be conventionally thermostatically controlled to heat the liquid deposited therein to its boiling point to thereby change it to vapor or steam. An overflow well 70 is provided on the side wall of chamber 46 and an escape siphon tube 72 is provided to drain off any overflow that occurs. The height of wall 70 determines the maximum amount of liquid that can accumulate in chamber 46 and also serves to restrict the drain siphon 72 from removing too much liquid from chamber 46.

In the illustrated embodiment, the lower portion of chamber 30 is provided with a flared skirt portion 31 having an outwardly extending flange provided with a plurality of hooks, one of which is illustrated at 78. The outer wall of chamber 46 is provided with latches one of which is shown at 76 and the upper flange between skirt 31 and the upper flange of chamber 46 is provided with a compressible annular sealing gasket 74. With the elements disposed as illustrated in FIG. 1 and the latches 76 closed, a fluidtight seal will be effected between the skirt 31 and the upper flange of chamber 46. With this arrangement, a user of the device can easily separate the chamber 46 from the rest of the apparatus to effect cleaning of the chamber 46 of any precipitate or sediment which will accumulate in this chamber where the boiling takes place. Also, with the parts separated as mentioned above, easy access is had to the valve 38 as well as the gas/liquid separating device 56, each of which parts are easily removed and cleaned or replaced, as is required.

The upper surface of the float 44 is provided with an arm 52 which engages the exterior portion of the valve member 40.

As the liquid in chamber 46 is heated, and changes to steam, the steam rises through the bottom opening defined by the annular seal 74 in chamber 30 and heats the exterior of tube 32 thereby heating the contents of tube 32 as the steam traverses the four baffles 34. At the uppermost portion of chamber 30, the steam will pass through opening 80 in the wall of chamber 30 and enter condenser tube 24, the exterior of which is cooled by contact with the incoming liquid through pressure regulator 14. As the steam condenses in tube 24, it passes down through the helical path of tube 24 and leaves the apparatus through the outlet 26 which may be connected to a suitable storage tank.

While the apparatus as described above is primarily designed for distilling water, it will be understood by those skilled in this art that with little or no modification, the apparatus can be used for distilling other liquids.

One of the principal features of the present invention is the use in second chamber 30 of the baffles 34. With this arrangement, the heavier particles carried up by the steam will impinge upon the baffles 34 and accumulate there or fall back into chamber 46, thus further purifying the steam and water produced by the system.

The device of the present invention which can be made entirely of stainless steel to minimize the take-up of impurities in the water, can be made ready for domestic use by a simple pre-adjustment of water pressure regulator 14 to compensate for the municipal water pressure in a given locality. The device 10 can be used on a kitchen countertop with a kitchen sink tap employed to supply water to hose 12 with any overflow from tube 72 draining into a sink. Particularly, in emergencies, where electrical power is not available, the skirt 31 can be fitted over a suitably dimensioned pan which may be heated over a wood or gas fire since a fluidtight seal is not absolutely necessary between chambers 30 and 46, although the efficiency of the device may be somewhat reduced without such a seal.

Having described the invention, it will be apparent to those skilled in this art that various changes may be made therein without departing from the spirit and scope of this invention as defined in the appended claims.

What is claimed is:

1. A distillation apparatus comprising:
a first chamber having means for receiving a liquid to be distilled,
a second chamber having conduit means therein for receiving liquid from said first chamber and means for exposing said conduit means to heat for heating the liquid to a predetermined temperature, said conduit means having an outlet, said outlet being in flow communication with gas/liquid separating means, said gas/liquid separating means located in said second chamber having a first outlet for the liquid and a second outlet for gas,
said apparatus further including a third chamber with said first outlet of said separating means disposed to deliver liquid to said third chamber, said third chamber including heating means for heating liquid therein to a temperature sufficient to vaporize the liquid therein, said third chamber having a first opening leading to the interior of said second chamber so that the vapors derived from heating the liquid in said third chamber will pass into said second chamber and supply said heat to heat said conduit means and liquid contained therein, said second chamber having an outlet at an end thereof opposite to the end adjacent said first opening of said third chamber, said outlet of said second chamber being connected to a condensing conduit which extends therefrom through said first chamber and having an end disposed exteriorly of said first chamber.

2. The apparatus as claimed in claim 1 wherein said second chamber has one open end connected to said first opening of said third chamber and is disposed, in use, vertically above said third chamber.

3. The apparatus as claimed in claim 1 wherein said first chamber surrounds one end of said second chamber, said first chamber having a base, said second chamber having an inlet to said conduit means in flow communication with said first chamber at a point thereof located at a vertical height above said base of said first chamber.

4. The apparatus as claimed in claim 1 wherein said conduit means is a tube that is bent in said second chamber to increase the path length of said conduit means in said second chamber, said tube having an end connected to a valve means disposed between said end of said tube and said separating means.

5. The apparatus as claimed in claim 4 wherein a plurality of spaced apart baffle means are provided in said second chamber to control the flow of the vapors across portions of said tube.

6. The apparatus as claimed in claim 5 wherein said valve means has an outlet connected to said gas/liquid separating means, the second outlet of which is located vertically above the first, liquid outlet thereof and which passes through an adjacent wall of said second chamber.

7. The apparatus as claimed in claims 1 or 6 wherein said gas/liquid separating means comprises a cell having an inlet intermediate its upper and lower ends, said cell having a first portion being adjacent said lower end and containing means for restricting splashing, a second portion divided from said first portion by a first wall segment having openings therethrough leading to said second portion, a second wall segment between said second portion and a third portion of said cell, said second wall segment having openings therethrough out of alignment with the openings in said first wall segment, said third portion of said cell having said second outlet for gas and said first portion of said cell having said first outlet for the liquid.

8. The apparatus as claimed in claim 4 wherein said valve means includes a valve member movable between an open and a closed position and a float member extending into said third chamber and movable to control said valve member in response to the liquid level in said third chamber.

9. The apparatus as claimed in claim 1 wherein said third chamber is removably and sealingly attached to said second chamber about said first opening of said third chamber.

10. The apparatus as claimed in claim 3 wherein insulating means are provided between said first and second chambers.

11. The apparatus as claimed in claim 1 wherein said second and third chambers are cylindrically shaped with the diameter of said third chamber being larger than the diameter of said second chamber.

* * * * *